United States Patent [19]

Hsu et al.

[11] Patent Number: 6,098,157
[45] Date of Patent: Aug. 1, 2000

[54] METHOD FOR STORING AND UPDATING INFORMATION DESCRIBING DATA TRAFFIC ON A NETWORK

[75] Inventors: Matthew A. Hsu; Jeffrey W. Cuppett, both of Mountain View; Reynold C. Leong, San Jose, all of Calif.

[73] Assignee: Shomiti Systems, Inc., San Jose, Calif.

[21] Appl. No.: 09/066,803

[22] Filed: Apr. 24, 1998

[51] Int. Cl.[7] ............................. G06F 12/00; G06F 7/00
[52] U.S. Cl. ..................... 711/157; 711/156; 711/168; 707/6
[58] Field of Search .................... 711/168, 156, 711/157; 707/6

[56] References Cited

U.S. PATENT DOCUMENTS 5,129,074   7/1992   Kikuchi et al. ...................... 711/173

*Primary Examiner*—Reginald G. Bragdon
*Attorney, Agent, or Firm*—Fenwick & West LLP

[57] ABSTRACT

A method for storing and updating records in a first table containing information corresponding to specific nodes of a network, and in a second table containing information corresponding to a combination of two specific nodes on a network, by indexing the first table with hashed forms of the node addresses, and the second table with hashed forms of a concatenation of the two node addresses, interleaving reads between the two tables to account for memory latency, and using the results of previous reads to reduce the number of future reads necessary for locating and updating the tables' records.

12 Claims, 7 Drawing Sheets

FIG. 3

| 302 | 304 | 306 | 308 | 310 | 312 |
|---|---|---|---|---|---|
| NODE ADDRESS | # OF PACKETS IN | # OF BYTES IN | # OF PACKETS OUT | # OF BYTES OUT | STATUS |

| 402 | 404 | 406 | 408 | 410 | 412 |
|---|---|---|---|---|---|
| CONCATENATION OF TWO NODE ADDRESSES | # OF PACKETS TRAVELING FROM FIRST NODE TO SECOND NODE | # OF BYTES TRAVELING FROM FIRST NODE TO SECOND NODE | # OF PACKETS TRAVELING FROM SECOND NODE TO FIRST NODE | # OF BYTES TRAVELING FROM SECOND NODE TO FIRST NODE | STATUS |

400

METHOD FOR STORING AND UPDATING INFORMATION DESCRIBING DATA TRAFFIC ON A NETWORK

BACKGROUND OF THE INVENTION

1. Field of the Invention

The present invention relates generally to data storage, and more particularly to a system and method for storing and updating data information which describes the flow of data traffic traveling between nodes on a network.

2. Description of the Related Art

As computer networks, such as local area networks ("LANs"), become increasingly complex with greater numbers of nodes, the problems associated with increased traffic of data packets traveling between those nodes also become increasingly complex. As such, it is useful to collect statistical information on the quantity and size of data packets traveling to and from specific nodes on the network during periods of time. With this type of statistical information, the network can be analyzed and possibly redesigned for improved transmission of data packets across the network. For example, if it is determined from the statistical information that 75% of the network traffic consists of data packets traveling exclusively between Node A and Node B, then the network could be redesigned to devote more transmission resources between these two nodes.

In order to accurately compile such statistical information, data corresponding to the quantity and size of data packets traveling into and out of each node on a network must be stored and indexed in a table by the address of each particular node. In this way, table entries can be located by node address and updated to account for new packets traveling into and out of each node. One possible way of creating such a table would be to allocate a separate row for every possible address of a node. However, in many conventional LAN configurations, the address of a node is 12 bytes long, resulting in potentially $2^{96}$ number of addresses, and therefore $2^{96}$ number of required rows. Such an extraordinarily high number of rows in a table is impractical, if not impossible, both in terms of memory size availability and speed of operation. A need exists, therefore, for a fast and simple system and method for storing and updating information in a table corresponding to specific nodes of a network.

It is also useful to store data in a second table which corresponds to the quantity and size of data packets traveling between two specific nodes on a network. Such data should be stored and indexed in the table by a combination of both addresses so that the table entry can be easily located and updated to account for new packets traveling between the two specific nodes. One possible way of creating this second table would be to allocate a separate row for every possible combination of node addresses on the LAN. However, this would also require an extraordinarily high number of rows and would therefore also be impractical in terms of memory size and speed of operation. A need also exists, therefore, for a fast and simple system and method for storing and updating information in a table corresponding to a combination of two specific nodes of a network.

SUMMARY OF THE INVENTION

In accordance with the present invention, there is provided a method for storing and updating information in a first table corresponding to specific nodes of a network by indexing the table with truncated, or hashed, forms of the node addresses, and using the results of previous reads of portions of the indexed addresses to reduce the number of future reads necessary for locating the indexed addresses and updating the table entries.

Furthermore, the present invention provides a method for storing and updating information in a second table corresponding to a combination of two specific nodes on a network by concatenating the two node addresses into one combined address, indexing the table with truncated, or hashed, forms of the combined address, and using the results of previous reads of portions of the indexed addresses to reduce the number of future reads necessary for locating the indexed addresses and updating the table entries.

In particular, the method of the present invention first interleaves reads of the status fields of a selected number of records in the first table with reads of the status fields of a selected number of records from the second table. Next, the method determines from these status fields whether each record read from each table is full or empty. For the full records only, reads of first portions of the address identifiers of records of the first table are interleaved with reads of the first portions of the address identifiers of the records of the second table. The read first portions of the address identifiers are then compared with a corresponding first portion of a node address, or a concatenation of two node addresses. For only those records having a previous portion of the address identifier matching a corresponding previous portion of the node address, or concatenation of node addresses, reads of a next portion of the address identifiers of records of the first table are interleaved with reads of a next portion of the address identifiers of the records of the second table, and the read next portion of the identifiers are compared with a corresponding next portion of the node address or concatenation of node addresses. Finally, for each record in the first and second table for which all portions of its address identifier matches all portions of the node address or concatenation of node addresses, the record is updated. If there is no complete match, then a new record is created and indexed by the node address or concatenation of node addresses. In a preferred embodiment, the number of address portions is a function of the length of the node address and the byte width of the memory bus. More particularly, the number of address portions is equal to the address size divided by the memory bus width.

The method of the present invention advantageously interleaves reads between the two tables to account for the memory latency. This interleaving allows for comparison checking while the next set of reads are queued. For example, the determination of the status field of at least one record occurs concurrently with the reading of the status fields of at least one other record. Thus, while the method determines whether a record in the first table is full, it reads the status fields of the second table's records. By the time the method begins reading the first part of the address of the records stored in the second table, it is known which records in this table are empty, and therefore time is not wasted needlessly reading empty records. In this way, the results of previous read operations are used to make further searching in a particular record unnecessary. This has the advantageous effect of rapidly reducing the number of required reads. For example, if it is determined that the record is empty, there is no need to perform any further comparisons of the address portions in that record. Moreover, if is determined that a segmented portion of the address identifier of a record does not match the corresponding portion of the node address, or concatenation of node addresses, then further unnecessary reads and comparisons for that particu-

BRIEF DESCRIPTION OF THE DRAWINGS

FIG. 3 is an illustration of a row in an exemplary table which contains information concerning the amount and size of data traveling into and out of a node on a LAN, in accordance with the present invention.

FIG. 4 is an illustration of a row in an exemplary table which contains information concerning the amount and size of data traveling between two specific nodes on a LAN, in accordance with the present invention.

DETAILED DESCRIPTION OF THE INVENTION

The figures depict a preferred embodiment of the present invention for purposes of illustration only. One skilled in the art will readily recognize from the following discussion that alternative embodiments of the structures and methods illustrated herein may be employed without departing from the principles of the invention described herein.

Figure 1:
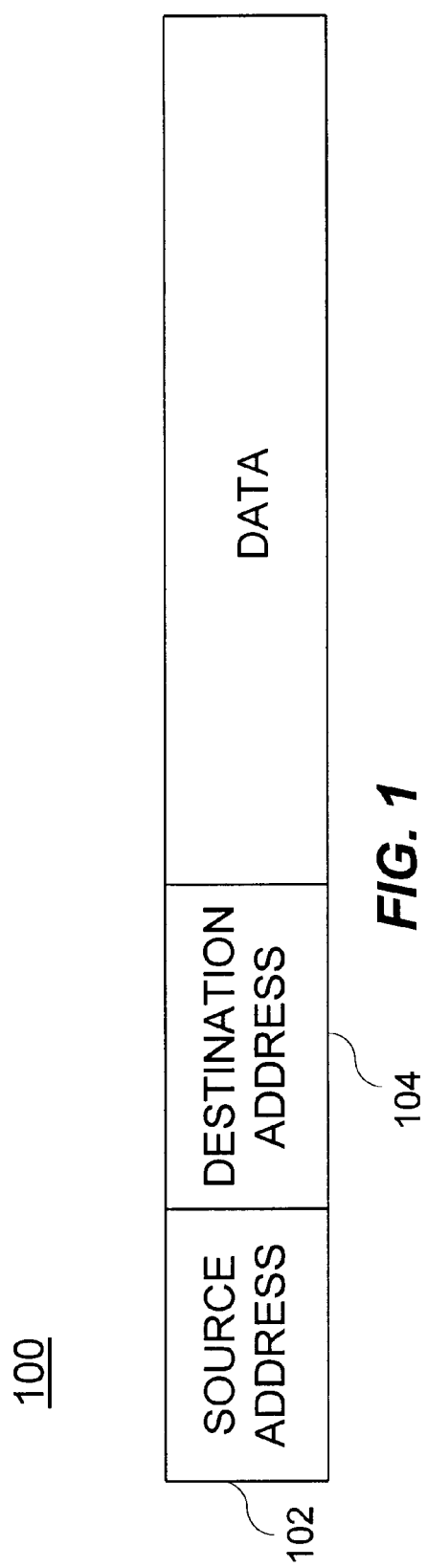
FIG. 1 is an illustration of an exemplary data packet which travels on a LAN, in accordance with the present invention.

Referring now to FIG. 1, there is shown an exemplary data packet 100 which travels on a LAN. The information contained in the packet 100 could be various types of information such as those types included in the layers of the Open Systems Interconnection ("OSI") model. Included in the data packet 100 is routing information. Specifically, the data packet 100 includes a source address 102 and a destination address 104. These are, respectively, the address of the node where the data packet 100 came from and the address of the node where the data packet 100 is going to. In a preferred embodiment of the present invention, the routing information is used to analyze the amount of data traffic traveling into and out of a single node and between multiple nodes on a LAN.

Figure 2:
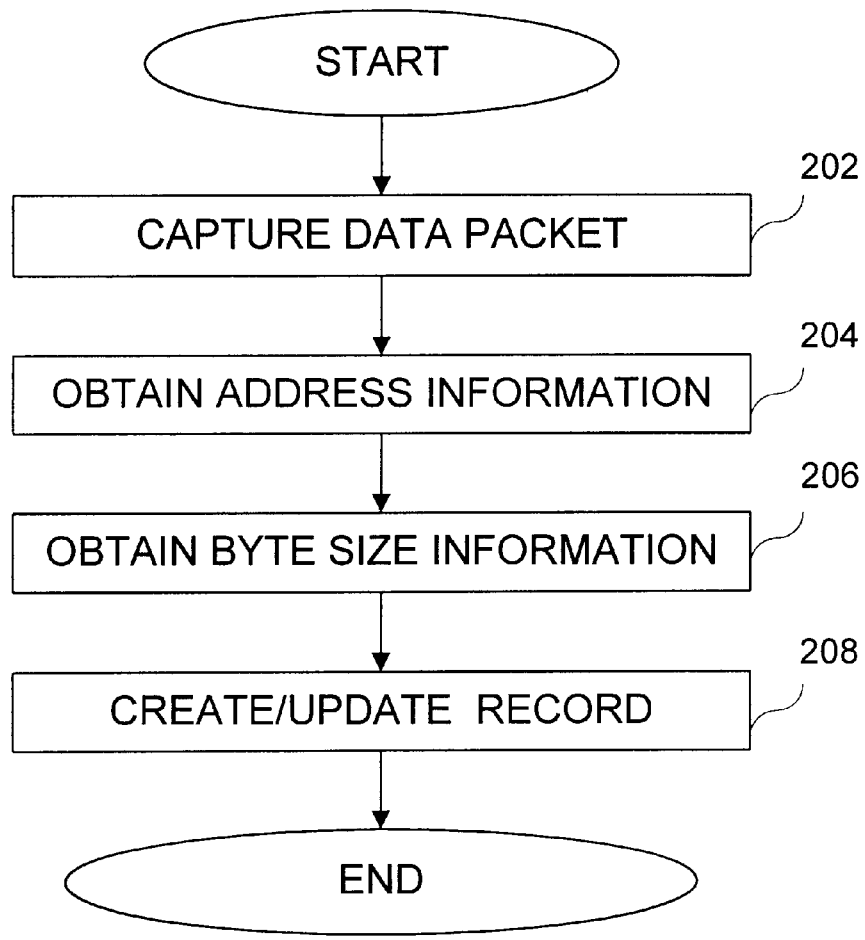
FIG. 2 is a flow diagram illustrating an exemplary process in which the method of the present invention is performed.

Referring now to FIG. 2, there is shown a flowchart 200 illustrating an exemplary process 200 in which the method of the present invention is performed. In this exemplary process 200, the data packet 100 is captured 202 by intercepting a data packet traveling along a data path of the LAN and copying it as a captured data packet 100 without interrupting the flow of the original data packet. This is accomplished by a conventional data packet capture software routine executed by the central processing unit ("CPU") of a conventional computer system.

The routing information, comprising the source address 102 and the destination address 104, is then obtained 204 from the captured data packet 100. Byte size information of the captured data packet 100 is also preferably obtained 206. This information is then used to create or update 208 records stored in the memory of a conventional computer used to track the amount and size of data traffic traveling into and out of specific nodes on the LAN, and the amount and size of data traffic traveling between two nodes on the LAN.

FIG. 3 shows a row 300 in an exemplary first table which contains information concerning the amount and size of data traveling into and out of a specific node on a LAN. Specifically, each row 300 from the table is indexed by a node address 302 and contains the following information:

(1) the total number of packets traveling into the node for a predetermined period of time 304;

(2) the total number of bytes traveling into the node for the predetermined period of time 306;

(3) the total number of packets traveling out of the node for the predetermined period of time 308; and (4) the total number of bytes traveling out of the node for the predetermined period of time 310.

Each row 300 also contains a status field 312 indicating whether the record is empty or not. Thus, when a data packet is first detected, a number of actions occur: first, a row in a table is indexed by the source address 102; second, the number of packets coming out of that node is set to "1"; third, the packet byte size information is stored; and fourth, the status field 312 is set to show that the record is full. In addition, a second row in the same table is indexed by the destination address 104, the number of packets going into that node is set to "1", the information concerning the packet byte size is stored, and the status field 312 for this record is set to show that the record is full.

Referring now to FIG. 4, there is shown a row 400 in an exemplary second table which contains information concerning the amount and size of data traveling between two nodes on a LAN. Specifically, each row 400 from the table is indexed by a concatenation 402 of the source address 102 and the destination address 104. The row 400 contains the following information:

(1) the total number of packets traveling from the first node to the second node for a predetermined period of time 404;

(2) the total number of bytes traveling from the first node to the second node for the predetermined period of time 406;

(3) the total number of packets traveling from the second node to the first node for the predetermined period of time 408; and (4) the total number of bytes traveling from the second node to the first node for the predetermined period of time 410.

Each row also contains a status field 412 which indicates whether the record is empty or not. Thus, when a data packet is detected, a row in a table is indexed by a concatenation 402 of the source address 102 and the destination address 104, the number of packets traveling from the source address 102 to the destination address 104 is set to "1," the information concerning the packet byte size is stored, and the status field 412 is set to show that the record is full. In a preferred embodiment, the concatenation of the source address 102 and the destination address 104 is performed by comparing the two addresses 102, 104 with each other and placing the address with the smallest quantitative value first. Thus, a conversation between the same two node addresses will always be appropriately stored in the same record.

Figure 5:
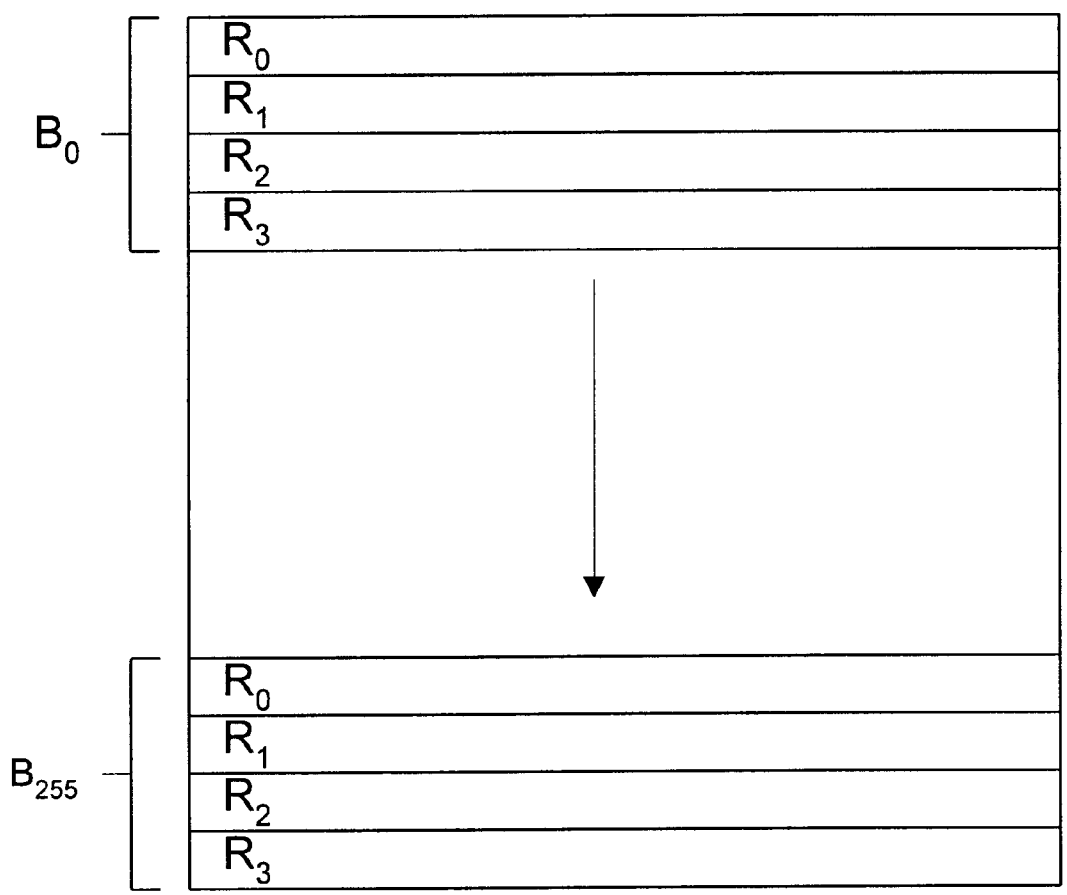
FIG. 5 is an illustration of an exemplary table located in the memory of a computer which is used to compile statistical information related to the quantity and size of data packets traveling on a LAN, in accordance with the present invention.

In FIG. 5 there is shown a preferred embodiment of a table 500 located in the memory of a conventional computer which is used to compile the statistical information related to the quantity and size of data packets traveling on a LAN. The table 500 preferably holds up to 1024 records. In a first table, these records contain information similar to the information described in FIG. 3. In a second table, these records contain information similar to the information described in FIG. 4. Thus, each row of the table 500 shown in FIG. 5 is uniquely indexed by either a node address 302, as shown in FIG. 3, or a concatenation 402 of two node addresses, as shown in FIG. 4. To perform the method of the present invention, the table 500 is subdivided into buckets, $B_0$–$B_{255}$, wherein each bucket preferably contains four records. Each bucket is indexed by a unique bucket identifier which is related to the address identifiers of the four records contained within the bucket. In a preferred embodiment, the unique bucket identifier is the resulting value obtained from hashing any of the 4 address identifiers using a conventional hashing algorithm.

Figure 6:
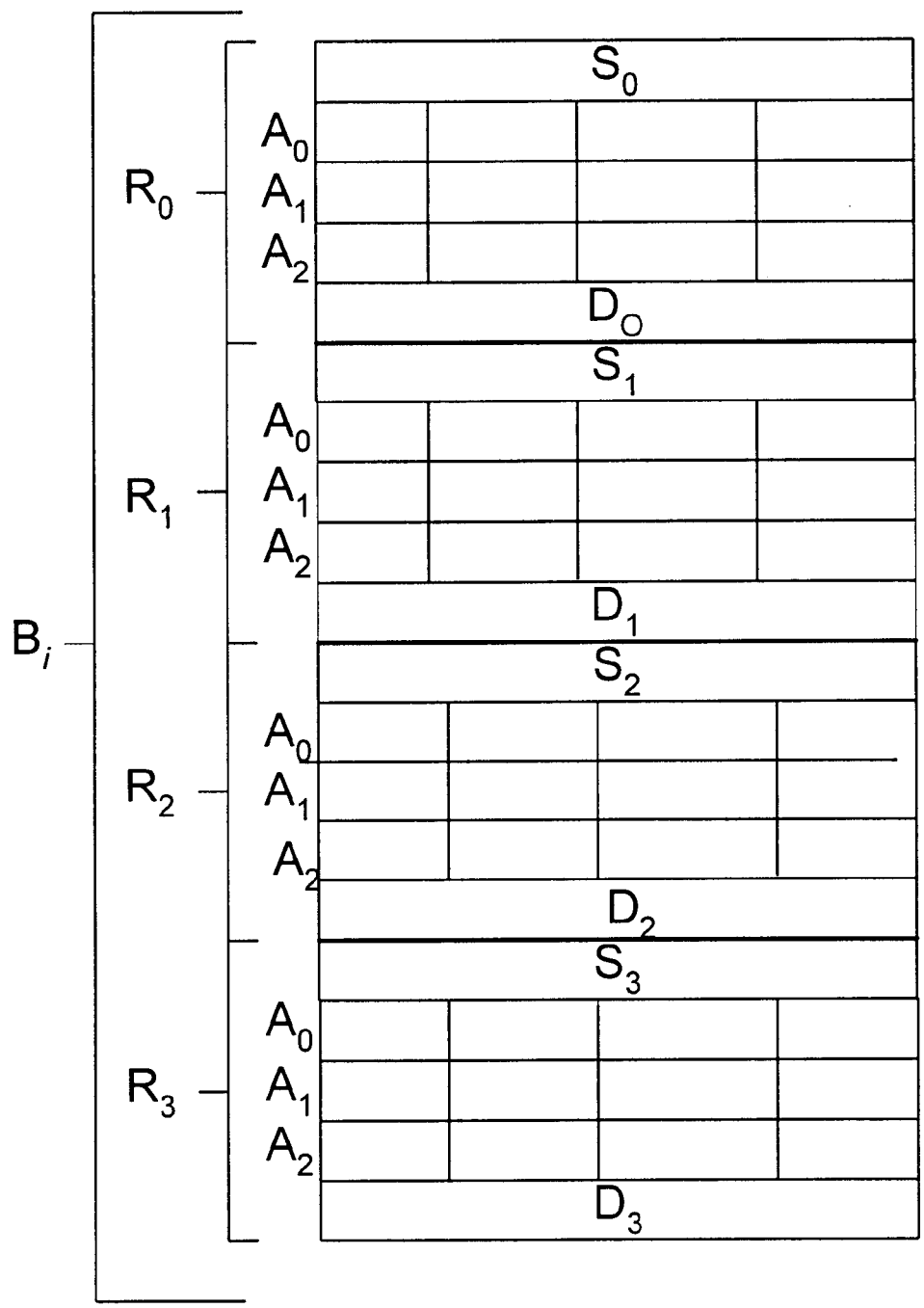
FIG. 6 is an illustration of a format of a bucket containing four records of information concerning the amount and size of data traveling into and out of a node on a LAN, in accordance with the present invention.

Referring now to FIG. 6, there is shown a preferred format of a bucket $B_i$ containing four records of information similar to the information described with reference to FIG. 3. In particular, the first record $R_0$ of the first bucket $B_0$ of the table 500 contains the following: (1) a status field $S_0$; (2) n portions of a node address: $A_0 \ldots A_{n-1}$, respectively; and (3) related information corresponding to the quantity and size of data packets traveling into and out of the node, collectively designated here as $D_0$. In a preferred embodiment, the number of address portions $A_n$ is a function of the length of the node address and the byte width of the memory bus. More particularly, the number of address portions is equal to the address size divided by the memory bus width. Thus, where the address identifier of the record is 12 bytes long, and the read capability of a conventional processor used to search the table 500 is 4 bytes per clock cycle—due to a 4 byte wide bus width limitation—there are three address portions—$A_0$, $A_1$, and $A_2$—for the 12-byte long address.

Figure 7:
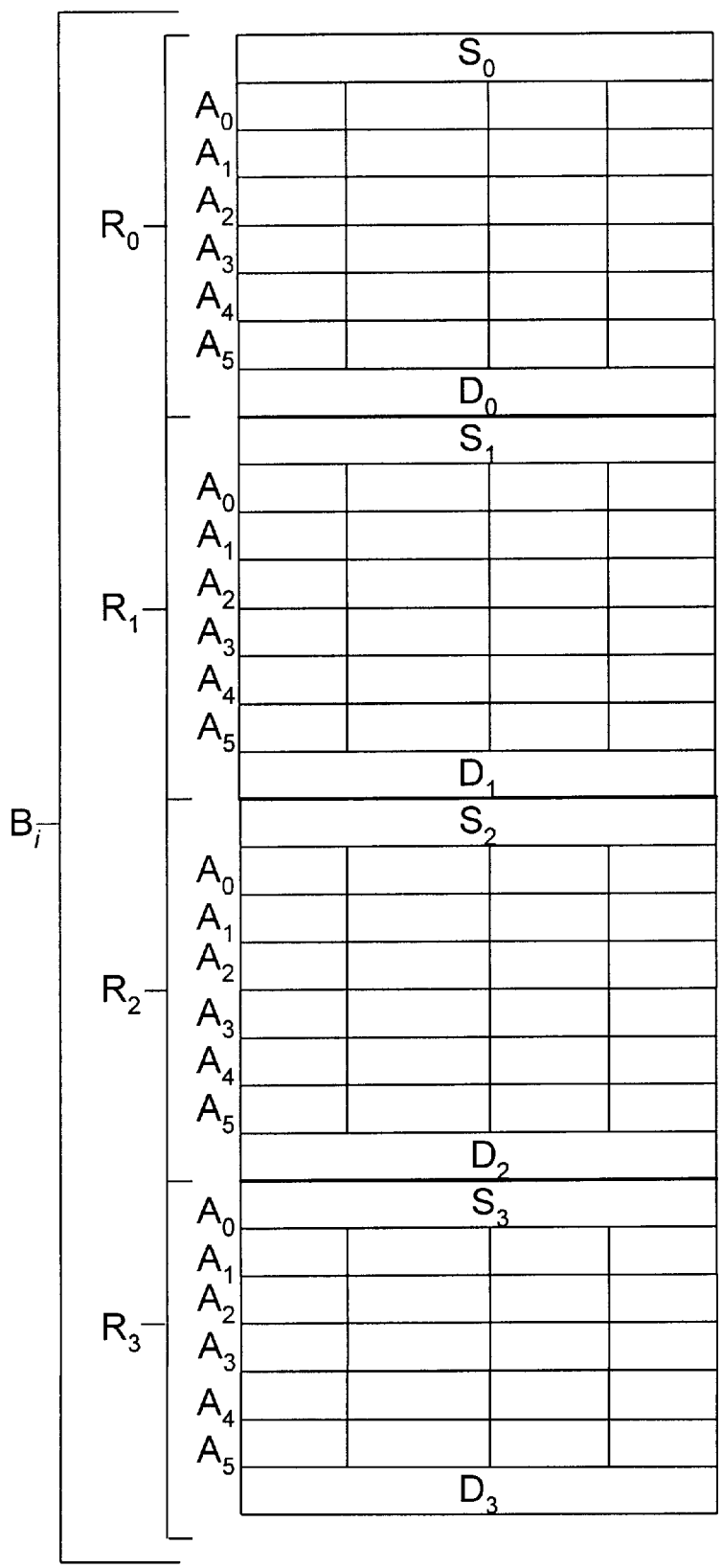
FIG. 7 is an illustration of a format of a bucket containing four records of information concerning the amount and size of data traveling between two specific nodes on a LAN, in accordance with the present invention.

Referring now to FIG. 7, there is shown a preferred format of a bucket $B_i$ containing four records of information similar to the information described with reference to FIG. 4. In particular, the first record $R_0$ of the first bucket $B_0$ of the table 500 contains: (1) a status field $S_0$; (2) n portions of a concatenation of two node addresses: $A_0 \ldots A_{n-1}$, respectively; and (3) related information corresponding to the quantity and size of data packets traveling into and out of the node, collectively designated here as $D_0$. In a preferred embodiment, the number of address portions $A_n$ is a function of the length of the concatenation of two node addresses and the byte width of the memory bus. More particularly, the number of address portions is equal to the address size divided by the memory bus width. Thus, where the address identifier of the record is 24 bytes long, and the read capability of a conventional processor used to search the table 500 is 4 bytes per clock cycle—due to a 4 byte wide bus width limitation—there are six address portions—$A_0$, $A_1$, $A_2$, $A_3$, $A_4$, and $A_5$—for the 24-byte long address.

In a preferred embodiment, the first table stores records containing the information described above with reference to FIG. 3. This table will be referred to hereinafter as the "Host Table" since it contains records relevant to the activity of a single network node. The second table stores records containing the information described above with reference to FIG. 4. This table will be referred to hereinafter as the "Conversation Table" since it contains records relevant to the activity between two network nodes. The Host Table's records are preferably formatted like those described with reference to FIG. 6. The Conversation Table's records are preferably formatted like those described with reference to FIG. 7.

Figure 8:
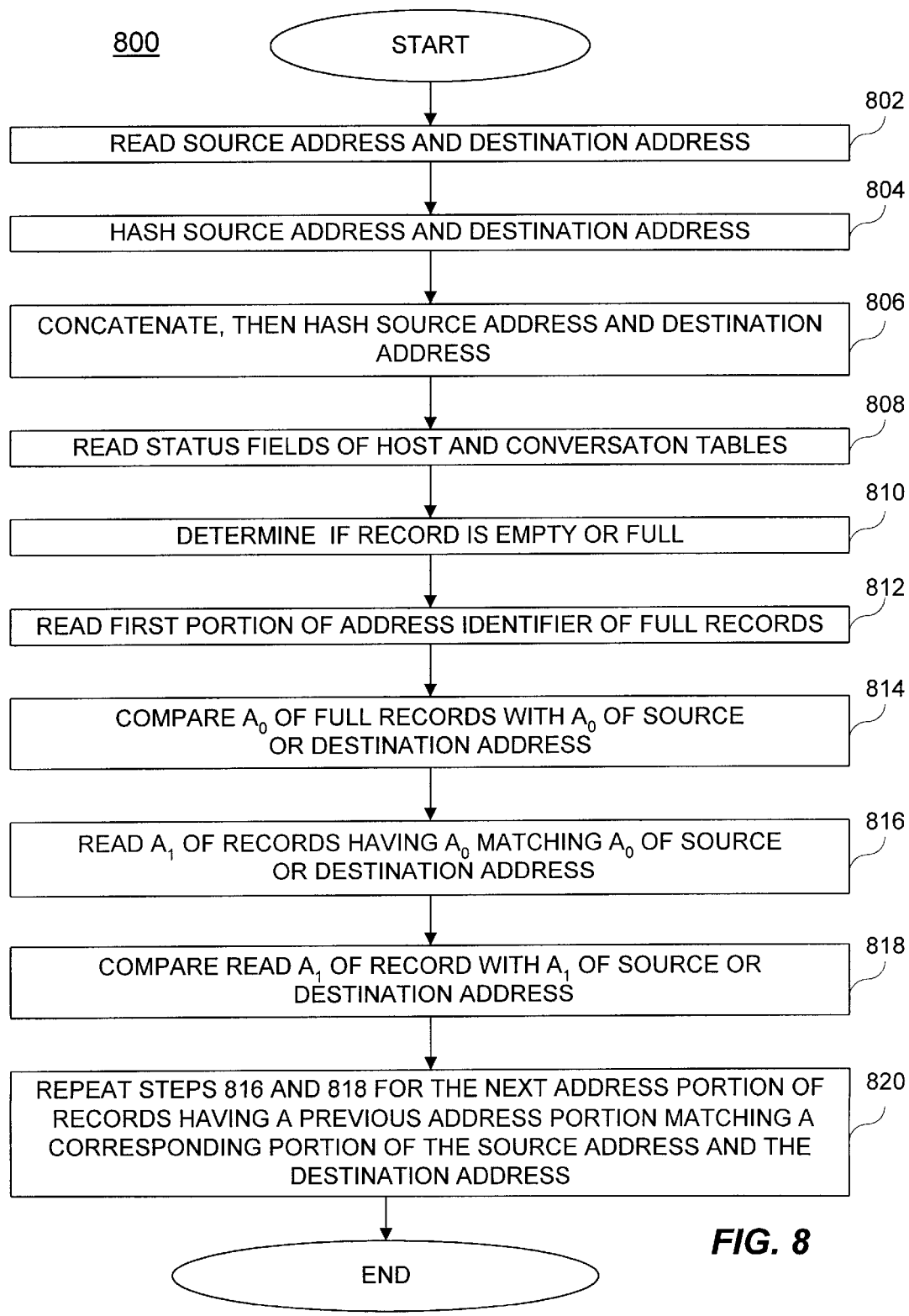
FIG. 8 is a flow diagram illustrating a method for storing and updating statistical information in a table, in accordance with the present invention.

The method of the present invention for storing and updating the statistical information in the Host Table and the Conversation Table will now be described with reference to the flow diagram 800 of FIG. 8. This method is preferably performed by a conventional computer system which includes a CPU and a memory having a fixed number of clock cycles of read latency and a data bus having a fixed bus width. In the preferred method described herein, the read latency is two clock cycles and the fixed bus width is four bytes wide.

The CPU first reads 802 the source address 102 and the destination address 104 of the captured data packet 100. Next, the source address 102 and the destination address 104 are both hashed 804 using a conventional hashing algorithm in order to determine the unique bucket identifiers of the buckets in the Host Table where the records will be either (a) created if none exists or (b) updated if a previous record for the address has been stored. The source address 102 and the destination address 104 are also concatenated and hashed 806 to determine the unique bucket identifiers of the buckets in the Conversation Table where the records will be stored or updated.

Next, the status field of every record in each of the determined buckets in the Host and Conversation Tables is read 808 to determine 810 whether each record is empty or full. These reads 808 are interleaved between the Host and Conversation Tables to account for the memory latency. For each record read that has a status field indicating a full record, a first portion $A_0$ of the address identifier is read 812. In a preferred embodiment, this portion $A_0$ consists of four bytes due to the bus width limitation mentioned previously. The reads of the first portion $A_0$ of the address identifier of the Host Table is interleaved with reads of the first portion $A_0$ of the address identifier of the Conversation Table. Next, the read first portions $A_0$ of the identifiers are compared 814 with a corresponding first portion of the source address 102 or destination address 104, or the concatenation of the two addresses 102, 104, or the concatenation of the two addresses 102, 104. This comparison occurs concurrently with the reading 812 of a first portion $A_0$ of the address identifier of another record.

For those records having a previous portion $A_0$ of the address identifier matching a corresponding previous portion of the source address 102 or destination address 104, or the concatenation of the two addresses 102, 104, the next portion $A_1$ of the identifiers of records are read 816. The reads of the records of the Host Table are again interleaved with the reads of the records of the Conversation Table. These read second portions $A_1$ of the identifiers are then compared 818 with a corresponding second portion of the source address 102 or destination address 104, or the concatenation of the two addresses 102, 104. This comparison occurs concurrently with the reading 816 of a second portion $A_1$ of the identifier of another record.

The steps of reading 816 portions of the address identifier, and comparing 818 those read portions with the corresponding portions of the source address 102 or destination address 104, or the concatenation of the two addresses 102, 104, are repeated 820 for the remaining address portions of those records having a previous address portion matching a corresponding previous portion of the source address 102 or destination address 104, or the concatenation of the two addresses 102, 104. Thus, for an address identifier with a number of portions equal to N, where N=address size/memory bus width, these reading 816 and comparing 818 steps are summarized as follows: for those records having a first portion $A_0$ of the address identifiers matching the first portion of the source address 102 or destination address 104, or the concatenation of the two addresses 102, 104, for each jth portion of the address identifier, where j=2 to N, reads of the jth portions of the address identifiers of records of the Host Table are interleaved with reads of the jth portions of the address identifiers of the records of the Conversation Table. The read jth portions of the identifiers are then compared with a corresponding jth portion of the source address 102 or destination address 104, or the concatenation of the two addresses 102, 104. These steps of reading and comparing are then repeated with j=j+1 for only those records having a (j−1)th portion of the address identifier matching the (j−1)th portion of the source address 102 or destination address 104, or the concatenation of the two addresses 102, 104. For each record in the Host Table and the Conversation Table for which all portions of its address identifier matches all portions of the source or destination addresses 102, 104, the record is updated with the appropriate size and quantity information from the new data packets. If there is no complete match, then a new record is created and indexed by the source address 102 or destination address 104, or the concatenation of the two addresses 102, 104.

The method of the present invention advantageously interleaves reads between the Host and Conversation Tables to account for the memory latency. This interleaving allows for comparison checking while the next set of reads are queued. For example, the determination 810 of the status field of at least one record occurs concurrently with the reading 808 of the status fields of at least one other record. Thus, while the system is determining 810 whether a record in the Conversation Table is full, it is reading 808 the status fields of the Host Table's records. By the time the system is ready to begin reading the first part of the address of the records stored in the Conversation Table, it will have determined which records in this table are empty, and will therefore not waste time needlessly reading empty records. In this way, the results of previous read operations are used to make further searching in a particular record unnecessary. This has the advantageous effect of rapidly reducing the number of required reads. For example, if it is determined that the record is empty, there is no need to perform any further comparisons of the source address 102 or destination address 104, or the concatenation of the two addresses 102, 104 with the segmented portions of the addresses $A_0$–$A_5$ in the empty record. Moreover, if is determined that a segmented portion of the address identifier of a record does not match the corresponding portion of the source 102 or destination address 104, then further unnecessary reads and comparisons for that particular record will not occur, thereby increasing the speed by which the CPU stores and updates the LAN traffic information.

In another preferred embodiment, the method of the present invention is used to update a single table. In this embodiment, the reads of status fields of a selected number of records in the table are interleaved with reads of status fields of a selected number of other records from the table. It is then determined whether the status fields of each read record indicates whether the record is full. The determination of the status field of at least one read record occurs concurrently with the reading of the status fields of at least one other record in the table. For those records read having a status field indicating a full record, the reads of a first portions of the identifiers of records of the table are interleaved with reads of the first portions of the identifiers of the other records of the table.

Next, the read first portions of the identifiers are compared with a corresponding first portion of the source address 102 or destination address 104. The comparison of the first portion of the identifier of at least one read record with the corresponding first portion of the known data value occurs concurrently with the reading of a first portion of the identifier of at least one other record. For those records having a previous portion of the identifier matching a corresponding previous portion of the source address 102 or destination address 104, reads of a next portion of the identifiers of records of the table are interleaved with reads of a next portion of the identifiers of the other records of the table. The read next portion of the identifiers are compared with a corresponding next portion of the source address 102 or destination address 104. Each record in the table with all portions of its identifier matching all portions of the source address 102 or destination address 104 is then updated.

From the above description, it will be apparent that the invention disclosed herein provides a novel and advantageous method for storing and updating information describing data traffic on a network. The foregoing discussion discloses and describes merely exemplary methods and embodiments of the present invention. As will be understood by those familiar with the art, the invention may be embodied in other specific forms without departing from the spirit or essential characteristics thereof. For example, it may be implemented in software, firmware, or ASIC and used in a router, bridge, network management software, other protocol decoders, or the like. Accordingly, the disclosure of the present invention is intended to be illustrative, but not limiting, of the scope of the invention, which is set forth in the following claims.

What is claimed is:

1. In a computer system including a memory having a fixed number of clock cycles of read latency and a data bus having a fixed byte width, a computer implemented method matching a known data value with records in table stored in the memory, each record including a unique identifier having a number of portions, the method comprising:

interleaving reads of portions of the identifiers of records of the table with reads of portions of the identifiers of the other records of the table;

comparing the read portions of the identifiers with a corresponding portion of the known data value, the comparison of the portion of the identifier of at least one read record with the corresponding portion of the known data value occurring concurrently with the reading of a portion of the identifier of at least one other record;

for only those records having a previous portion of the identifier matching a corresponding previous portion of the known data value:

interleaving reads of a next portion of the identifiers of records of the table with reads of a next portion of the identifiers of the other records of the table; and comparing the read next portion of the identifiers with a corresponding next portion of the known data value;

for each record in the table for which all portions of its identifier matches all portions of the known data value, updating the record.

2. The method of claim 1, further comprising creating a new record in the table if at least one portion of the identifiers of the records does not match a corresponding portion of the known data value.

3. In a computer system including a memory having a fixed number of clock cycles of read latency and a data bus having a fixed byte width, a computer implemented method matching a known data value with records in a first and second table stored in the memory, each table including a plurality of records, each record including a status field indicating whether the record is empty or full, and a unique identifier having a number of portions, each portion equal to the byte width of the data bus, and the known data value having a corresponding number of portions, the method comprising:

interleaving reads of the status fields of a selected number of records in the first table with reads of the status fields of a selected number of records from the second table, the number of records read determined according to the read latency of the memory;

for at least one read record, determining concurrently with the reading of the status field of another record, whether the status field of the read record indicates the record being full or empty;

for only those records read having a status field indicating a full record:
    interleaving reads of first portions of the identifiers of records of the first table with reads of the first portions of the identifiers of the records of the second table; and
    comparing the read first portions of the identifiers with a corresponding first portion of the known data value, the comparison of the first portion of the identifier of at least one read record with the corresponding first portion of the known data value occurring concurrently with the reading of a first portion of the identifier of at least one other record;

for each of the portions of the known data value:
    for only those records having a previous portion of the identifier matching a corresponding previous portion of the known data value, interleaving reads of a next portion of the identifiers of records of the first table with reads of a next portion of the identifiers of the records of the second table; and
    comparing the read next portion of the identifiers with a corresponding next portion of the known data value;

for each record in the first and second table for which all portions of its identifier matches all portions of the known data value, updating the record.

4. The method of claim 3, further comprising creating a new record in the first table and a new record in the second table if at least one portion of the identifiers of the records in the first and second tables does not match a corresponding portion of the known data value.

5. In a computer system including a memory having a fixed number of clock cycles of read latency and a data bus having a fixed byte width, a computer implemented method matching a known data value with records in a first and second table stored in the memory, each table including a plurality of records, each record including a status field indicating whether the record is empty or full, and a unique identifier having N portions, each portion equal to the byte width of the data bus, the method comprising:

interleaving reads of the status fields of a selected number of records in the first table with reads of the status fields of a selected number of records from the second table, the number of records read determined according to the read latency of the memory;

for only those records read having a status field indicating a full record:
    interleaving reads of first portions of the identifiers of records of the first table with reads of the first portions of the identifiers of the records of the second table; and
    comparing the read first portions of the identifiers with a corresponding first portion of the known data value;

for only those records having a first portion of the identifiers matching the first portion of the known data value:
    for each jth portion of the identifiers, where j=2 to N, for only those records having a (j−1)th portion of the identifiers matching the (j−1)th portion of the known data value:
      interleaving reads of the jth portions of the identifiers of records of the first table with reads of the jth portions of the identifiers of the records of the second table; and
      comparing the read jth portions of the identifiers with a corresponding jth portion of the known data value;

for each record in the first and second table for which all portions of its identifier matches all portions of the known data value, updating the record.

6. The method of claim 5, further comprising creating a new record in the first table and a new record in the second table if at least one portion of the identifiers of the records in the first and second tables does not match a corresponding portion of the known data value.

7. In a computer system including a memory having a fixed number of clock cycles of read latency and a data bus having a fixed byte width, a computer implemented method matching a known data value with records in a table stored in the memory, the table including a plurality of records, each record including a status field indicating whether the record is empty or full, and a unique identifier having a number of portions, each portion equal to the byte width of the data bus, and the known data value having a corresponding number of portions, the method comprising:

interleaving reads of the status fields of a selected number of records in the table with reads of the status fields of a selected number of other records from the table, the number of records read determined according to the read latency of the memory;

determining whether the status fields of each read record indicates the record being full or empty, the determination of the status field of at least one read record occurring concurrently with the reading of the status fields of at least one other record;

for only those records read having a status field indicating a full record:
    interleaving reads of first portions of the identifiers of records of the table with reads of the first portions of the identifiers of the other records of the table;
    comparing the read first portions of the identifiers with a corresponding first portion of the known data value, the comparison of the first portion of the identifier of at least one read record with the corresponding first portion of the known data value occurring concurrently with the reading of a first portion of the identifier of at least one other record;

for each of the portions of the known data value:
  for only those records having a previous portion of the identifier matching a corresponding previous portion of the known data value, interleaving reads of a next portion of the identifiers of records of the table with reads of a next portion of the identifiers of the other records of the table; and
  comparing the read next portion of the identifiers with a corresponding next portion of the known data value;
for each record in the table for which all portions of its identifier matches all portions of the known data value, updating the record.

8. The method of claim 7, further comprising creating a new record in the table if at least one portion of the identifiers of the records in the table does not match a corresponding portion of the known data value.

9. In a computer system including a memory having a fixed number of clock cycles of read latency and a data bus having a fixed byte width, a computer implemented method matching a known data value with records in a first and second table stored in the memory, each record including a unique identifier having a number of portions, the method comprising:
  interleaving reads of portions of the identifiers of records of the first table with reads of portions of the identifiers of the records of the second table;
  comparing the read portions of the identifiers with a corresponding portion of the known data value, the comparison of the portion of the identifier of at least one read record with the corresponding portion of the known data value occurring concurrently with the reading of a portion of the identifier of at least one other record;
  for only those records having a previous portion of the identifier matching a corresponding previous portion of the known data value:
    interleaving reads of a next portion of the identifiers of records of the first table with reads of a next portion of the identifiers of the records of the second table; and
    comparing the read next portion of the identifiers with a corresponding next portion of the known data value;
  for each record in the first and second table for which all portions of its identifier matches all portions of the known data value, updating the record.

10. The method of claim 9, further comprising creating a new record in the first table and a new record in the second table if at least one portion of the identifiers of the records in the first and second tables does not match a corresponding portion of the known data value.

11. In a computer system including a memory having a fixed number of clock cycles of read latency and a data bus having a fixed byte width, a computer implemented method matching a known data value with records in a first and second table stored in the memory, each table including a plurality of records, each record including a status field indicating whether the record is empty or full, and a unique identifier having a number of portions, each portion equal to the byte width of the data bus, and the known data value having a corresponding number of portions, the method comprising:
  interleaving reads of the status fields of a selected number of records in the first table with reads of the status fields of a selected number of records from the second table, the number of records read determined according to the read latency of the memory;
  determining whether the status fields of each read record indicates the record being full or empty, the determination of the status field of at least one read record occurring concurrently with the reading of the status fields of at least one other record;
  for only those records read having a status field indicating a full record:
    interleaving reads of first portions of the identifiers of records of the first table with reads of the first portions of the identifiers of the records of the second table;
    comparing the read first portions of the identifiers with a corresponding first portion of the known data value, the comparison of the first portion of the identifier of at least one read record with the corresponding first portion of the known data value occurring concurrently with the reading of a first portion of the identifier of at least one other record;
  for each of the remaining portions of the known data value:
    for only those records having a previous portion of the identifier matching a corresponding previous portion of the known data value, interleaving reads of a next portion of the identifiers of records of the first table with reads of a next portion of the identifiers of the records of the second table; and
    comparing the read next portion of the identifiers with a corresponding next portion of the known data value;
  for each record in the first and second table for which all portions of its identifier matches all portions of the known data value, updating the record.

12. The method of claim 11, further comprising creating a new record in the first table and a new record in the second table if at least one portion of the identifiers of the records in the first and second tables does not match a corresponding portion of the known data value.

* * * * *